United States Patent
Garland et al.

(10) Patent No.: US 8,141,199 B1
(45) Date of Patent: Mar. 27, 2012

(54) HEAT EXCHANGER SYSTEM

(76) Inventors: Peter C. Garland, Holiday, FL (US); Julie A. Garland, Holiday, FL (US)

(*) Notice: Subject to any disclaimer, the term of this patent is extended or adjusted under 35 U.S.C. 154(b) by 1107 days.

(21) Appl. No.: 12/009,018

(22) Filed: Jan. 16, 2008

Related U.S. Application Data

(60) Provisional application No. 60/900,746, filed on Feb. 12, 2007.

(51) Int. Cl.
*A47L 11/30* (2006.01)
(52) U.S. Cl. .......................... 15/320; 165/156
(58) Field of Classification Search ............ 15/320–322; 165/156; *A47L 11/30*
See application file for complete search history.

(56) References Cited

U.S. PATENT DOCUMENTS

| | | | | |
|---|---|---|---|---|
| 4,940,082 A | * | 7/1990 | Roden | 15/321 |
| 5,469,598 A | * | 11/1995 | Sales | 15/321 |
| 7,841,042 B2 | * | 11/2010 | Roden et al. | 15/320 |
| 2005/0133202 A1 | * | 6/2005 | Jorgensen et al. | 165/103 |

* cited by examiner

*Primary Examiner* — David Redding

(57) ABSTRACT

A coil heater assembly has a housing. The housing has a heated gas inlet and a heated gas outlet. The coil heater assembly has a plurality of coils. The coils are formed of a single tube. The coils are shaped into separate coils with a water inlet and a water outlet. Each of the coils is spiraled around its own unique axis. The axes are parallel with respect to each other. In this manner the heat transfer between the gas and water within the coil heater assembly is maximized.

2 Claims, 4 Drawing Sheets

HEAT EXCHANGER SYSTEM

RELATED APPLICATION

This application is based upon Provisional Application No. 60/900,746 filed Feb. 12, 2007, the subject matter of which is incorporated herein by reference.

BACKGROUND OF THE INVENTION

1. Field of the Invention

The present invention relates to a heat exchanger system and more particularly pertains to utilizing exhaust from an internal combustion engine to rapidly provide high pressure hot water for use in carpet cleaning in a safe, convenient and economical manner.

2. Description of the Prior Art

The use of cleaning systems of known designs and configurations is known in the prior art. More specifically, cleaning systems of known designs and configurations previously devised and utilized for the purpose of cleaning through known methods and apparatuses are known to consist basically of familiar, expected, and obvious structural configurations, notwithstanding the myriad of designs encompassed by the crowded prior art which has been developed for the fulfillment of countless objectives and requirements.

While these devices fulfill their respective, particular objectives and requirements, the prior art does not describe a heat exchanger system that allows for utilizing exhaust from an internal combustion engine to rapidly provide high pressure hot water for use in carpet cleaning in a safe, convenient and economical manner.

In this respect, the heat exchanger system according to the present invention substantially departs from the conventional concepts and designs of the prior art, and in doing so provides an apparatus primarily developed for the purpose of utilizing exhaust from an internal combustion engine to rapidly provide high pressure hot water for use in carpet cleaning in a safe, convenient and economical manner.

Therefore, it can be appreciated that there exists a continuing need for a new and improved heat exchanger system which can be used for utilizing exhaust from an internal combustion engine to rapidly provide high pressure hot water for use in carpet cleaning in a safe, convenient and economical manner. In this regard, the present invention substantially fulfills this need.

SUMMARY OF THE INVENTION

In view of the foregoing disadvantages inherent in the known types of cleaning systems of known designs and configurations now present in the prior art, the present invention provides an improved heat exchanger system. As such, the general purpose of the present invention, which will be described subsequently in greater detail, is to provide a new and improved heat exchanger system and method which has all the advantages of the prior art and none of the disadvantages.

To attain this, the present invention essentially comprises a heat exchanger system. First provided is an internal combustion engine. The engine has an engine output line. The engine creates gas as an initial exhaust. The gas is dispensed through the engine output line. The engine is adapted to provide motive power to other parts of the system.

A water handling assembly includes a pressure regulator. The water handling assembly includes a pre-heater. The water handling assembly also includes a mix tank. The water handling assembly further includes a water pump. The water pump is powered by the engine. In this manner pressurized water is moved in a closed loop path between the pressure regulator and the pre-heater and the mix tank. The water handling assembly also includes an air heating blower. The air heating blower is powered by the engine. The blower has an air inlet. In this manner a vacuum is generated. The blower also has a heated air outlet. The heated air outlet is coupled to the pre-heater. In this manner water is preheated in the water assembly. The pre-heater includes a water path. The water path has a single spiral wound tube. Water passes through the spiral sound tube while moving from the pressure regulator to the mix tank. The pre-heater also has an air path. The pre-heater has an input line. The input line is provided from the blower. The pre-heater also has an output line. The water path and the air from the output of the blower are in heat exchanging relationship within the pre-heater. The mix tank includes a water inlet line. In this manner make-up water is supplied to the system. The mix tank is adapted to store pre-heated water for circulation by the water pump.

Provided next is a three coil heater assembly. The three coil heater assembly has a cylindrical housing. The housing has an initial exhaust inlet. The initial exhaust inlet is provided from the engine. The housing has an intermediate exhaust outlet. The three coil heater assembly has a pre-heated pressurized water inlet. The pre-heated pressurized water inlet is provided from the pressure regulator. The three coil heater assembly has a hot water outlet. The three coil heater assembly has three coils. The three coils are formed of a single tube. The three coils are further formed into three separate coils. The three coils are coupled by fittings with a water inlet and a water outlet. Each of the coils is of a common size and common shape. The coils each have a unique axis. Each of the coils is spiraled around its own unique axis. The axes are parallel with respect to each other. The axes are equally spaced from the housing. In this manner the heat transfer between the initial exhaust and water within the three coils is maximized.

Further provided is a final stage heater. The final stage heater has a housing. The housing receives the intermediate exhaust from the three coil heater assembly. The housing further emits a final exhaust. The final stage heater also includes a single spiral wound tube. The single spiral sound tube receives hot water from the three coils. The single spiral wound tube and the intermediate exhaust are in heat exchanging relationship within the final stage heater.

Provided last is a wand. The wand has a final line. The final line receives high pressure hot water from the final stage heater. The final line selectively delivers the received high pressure hot water to a carpet. In this manner cleaning is provided.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims attached.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved heat exchanger system which has all of the advantages of the prior art cleaning systems of known designs and configurations and none of the disadvantages.

It is another object of the present invention to provide a new and improved heat exchanger system which may be easily and efficiently manufactured and marketed.

It is further object of the present invention to provide a new and improved heat exchanger system which is of durable and reliable constructions.

An even further object of the present invention is to provide a new and improved heat exchanger system which is susceptible of a low cost of manufacture with regard to both materials and labor, and which accordingly is then susceptible of low prices of sale to the consuming public, thereby making such heat exchanger system economically available to the buying public.

Even still another object of the present invention is to provide a heat exchanger system for utilizing exhaust from an internal combustion engine to rapidly provide high pressure hot water for use in carpet cleaning in a safe, convenient and economical manner.

Lastly, it is an object of the present invention to provide a new and improved heat exchanger system. A coil heater assembly has a housing. The housing has a heated gas inlet and a heated gas outlet. The coil heater assembly has a plurality of coils. The coils are formed of a single tube. The coils are shaped into separate coils with a water inlet and a water outlet. Each of the coils is spiraled around its own unique axis. The axes are parallel with respect to each other. In this manner the heat transfer between the gas and water within the coil heater assembly is maximized.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts throughout the various Figures.

DESCRIPTION OF THE PREFERRED EMBODIMENT

Figure 1:
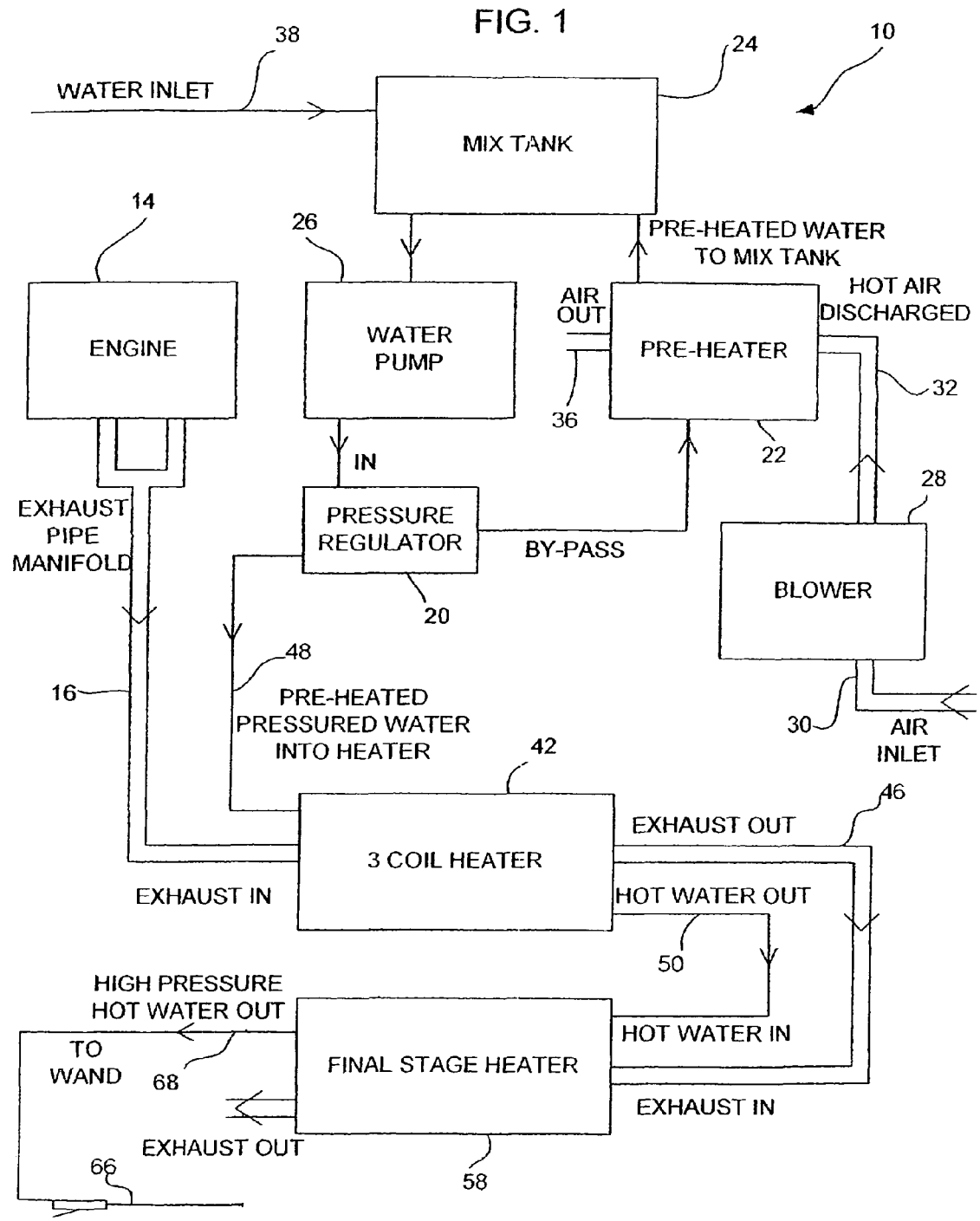
FIG. 1 is a schematic block diagram illustrating a heat exchanger system constructed in accordance with the principles of the present invention.
Figure 2:
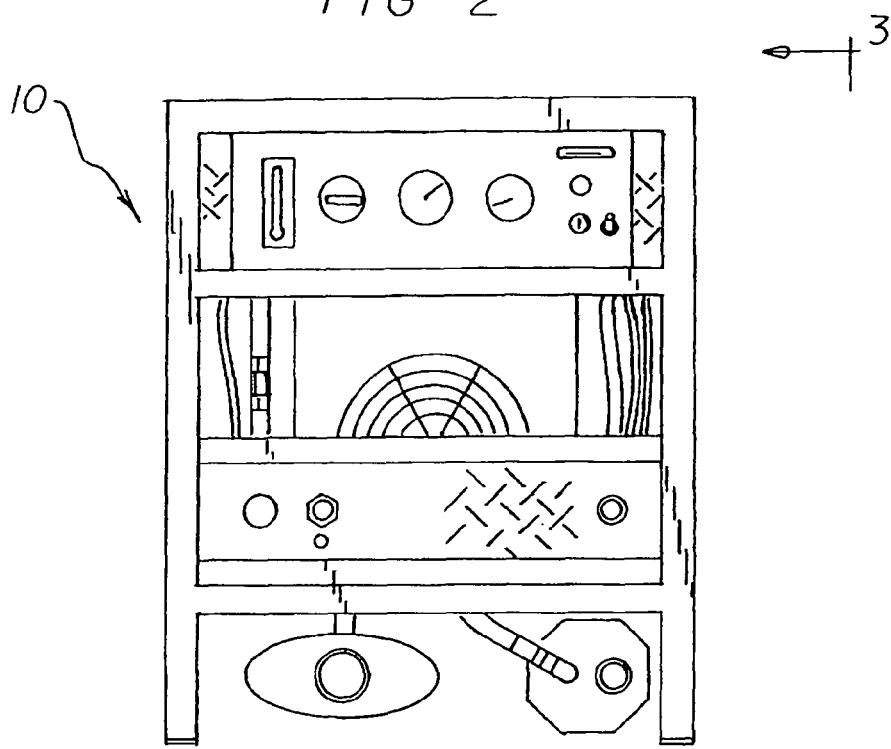
FIG. 2 is a front elevational view of the heat exchange system of FIG. 1.
Figure 3:
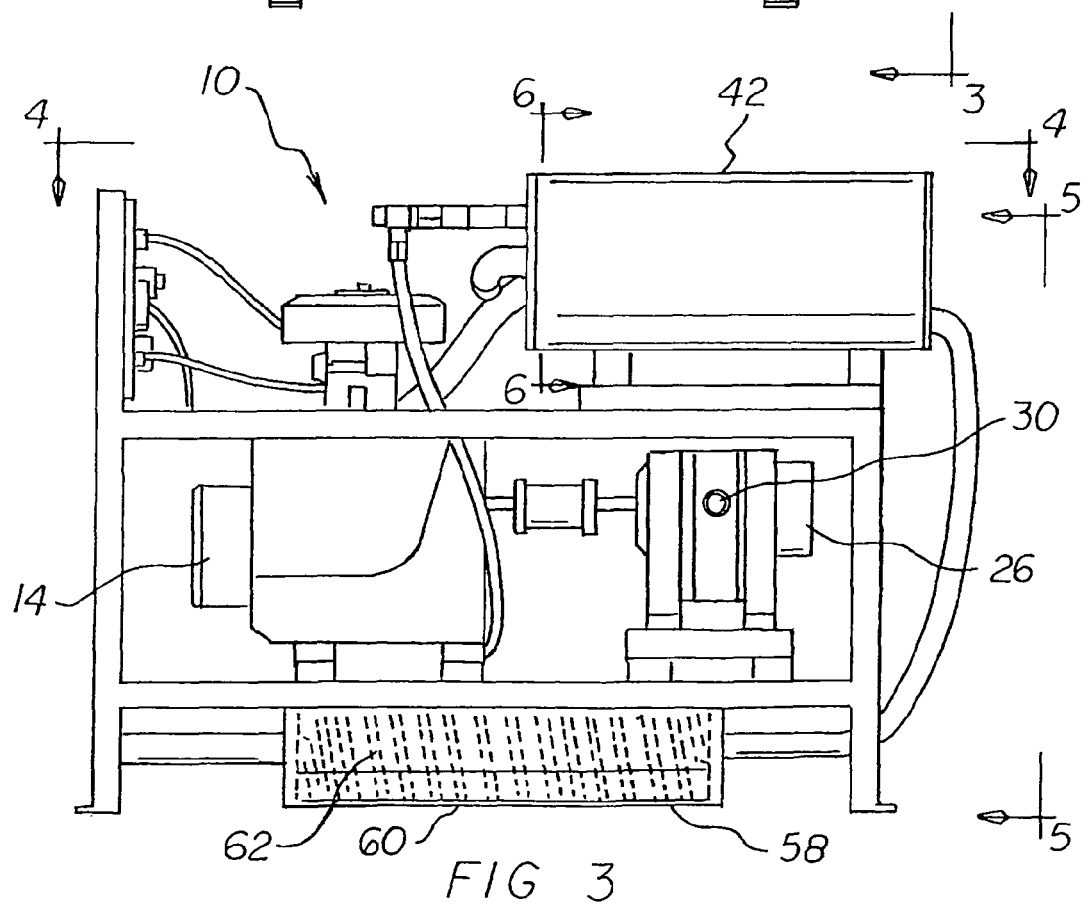
FIG. 3 is a side elevational view of the heat exchange system taken along line 3-3 of FIG. 2.
Figure 4:
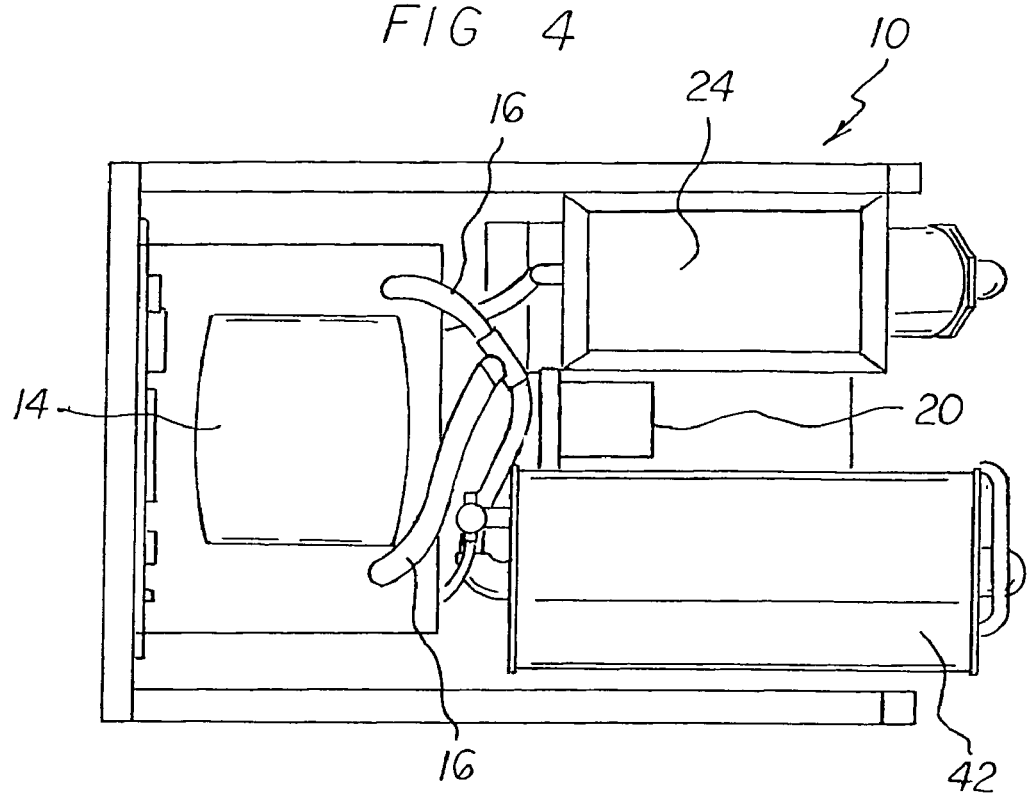
FIG. 4 is a plan view of the heat exchange system taken along line 4-4 of FIG. 3.
Figure 5:
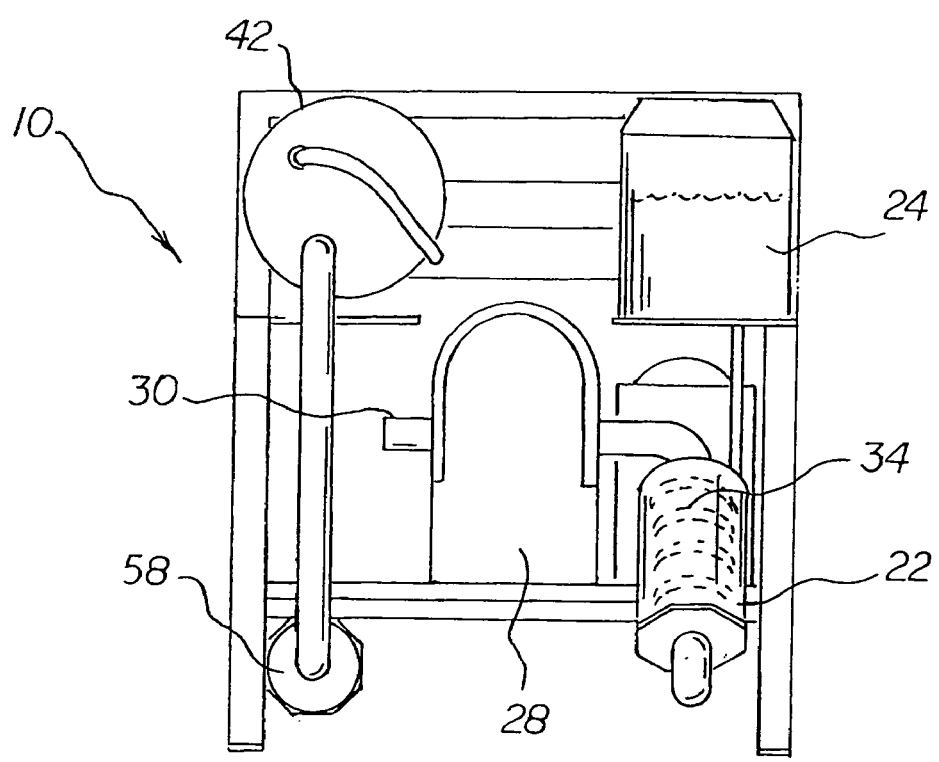
FIG. 5 is an end elevational view of the heat exchange system taken along line 5-5 of FIG. 3.
Figures 6, 7:
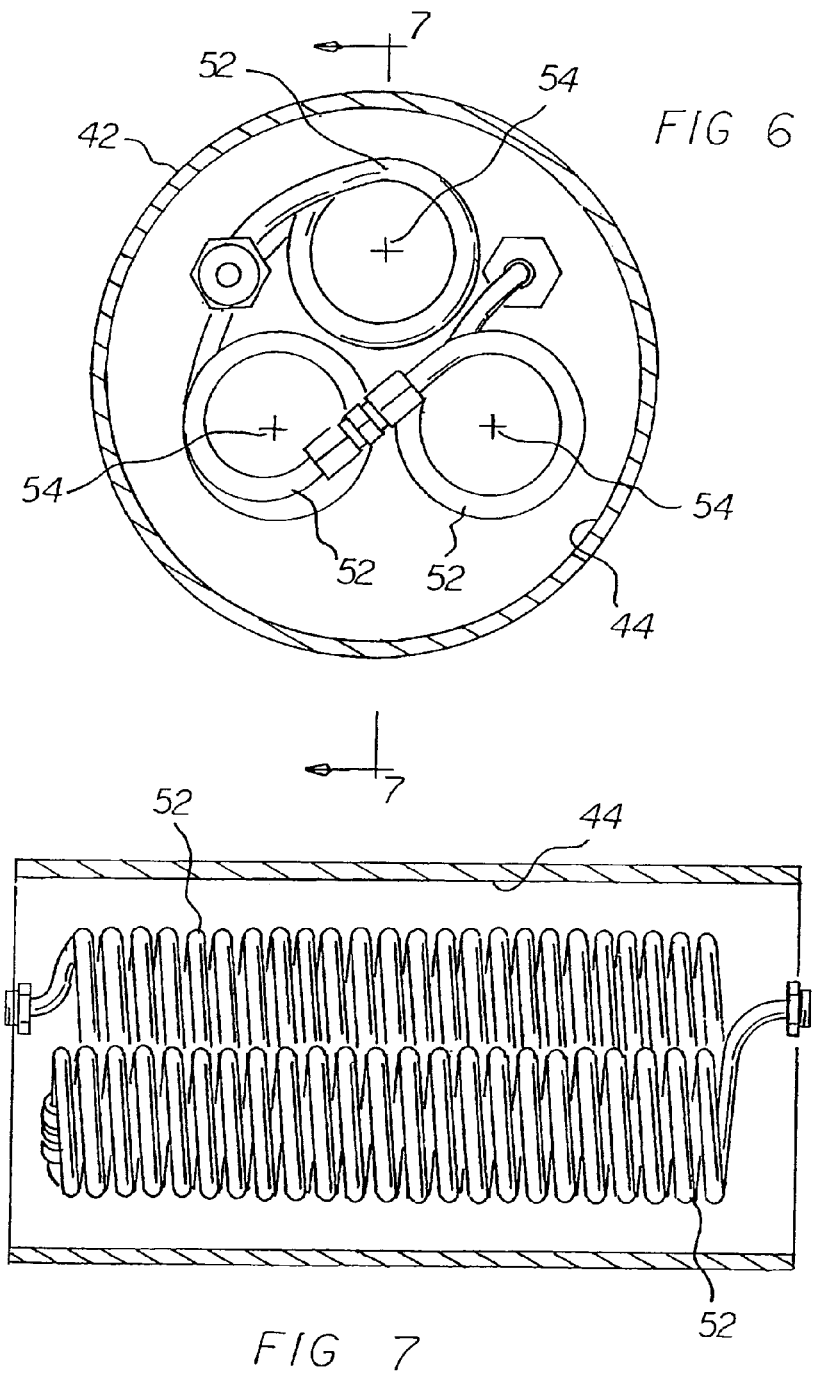
FIG. 6 is a cross sectional view of the heat exchange system taken along line 6-6 of FIG. 3.
FIG. 7 is a cross sectional view of the heat exchange system taken along line 7-7 of FIG. 6.

With reference now to the drawings, and in particular to FIG. 1 thereof, the preferred embodiment of the new and improved heat exchanger system embodying the principles and concepts of the present invention and generally designated by the reference numeral 10 will be described.

The present invention, the heat exchanger system 10 is comprised of a coil heater assembly to attain the desired objective.

First provided is an internal combustion engine 14. The engine has an engine output line 16. The engine creates gas as an initial exhaust. The gas is dispensed through the engine output line. The engine is adapted to provide motive power to other parts of the system.

A water handling assembly includes a pressure regulator 20. The water handling assembly includes a pre-heater 22. The water handling assembly also includes a mix tank 24. The water handling assembly further includes a water pump 26. The water pump is powered by the engine. In this manner pressurized water is moved in a closed loop path between the pressure regulator and the pre-heater and the mix tank. The water handling assembly also includes an air heating blower 28. The air heating blower is powered by the engine. The blower has an air inlet 30. In this manner a vacuum is generated. The blower also has a heated air outlet 32. The heated air outlet is coupled to the pre-heater. In this manner water is preheated in the water assembly. The pre-heater includes a water path. The water path has a single spiral wound tube 34. Water passes through the spiral sound tube while moving from the pressure regulator to the mix tank. The pre-heater also has an air path. The pre-heater has an input line 32. The input line is provided from the blower. The pre-heater also has an output line 36. The water path and the air from the output of the blower are in heat exchanging relationship within the pre-heater. The mix tank includes a water inlet line 38. In this manner make-up water is supplied to the system. The mix tank is adapted to store pre-heated water for circulation by the water pump.

Provided next is a three coil heater assembly 42. The three coil heater assembly has a cylindrical housing 44. The housing has an initial exhaust inlet. The initial exhaust inlet is provided from the engine. The housing has an intermediate exhaust outlet 46. The three coil heater assembly has a pre-heated pressurized water inlet 48. The pre-heated pressurized water inlet is provided from the pressure regulator. The three coil heater assembly has a hot water outlet 50. The three coil heater assembly has three coils 52, 52, 52. The three coils are formed of a single tube. The three coils are further formed into three separate coils. The three coils are coupled by fittings with a water inlet and a water outlet. Each of the coils is of a common size and common shape. The coils each have a unique axis 54. Each of the coils is spiraled around its own unique axis. The axes are parallel with respect to each other. The axes are equally spaced from the housing. In this manner the heat transfer between the initial exhaust and water within the three coils is maximized.

Further provided is a final stage heater 58. The final stage heater has a housing 60. The housing receives the intermediate exhaust from the three coil heater assembly. The housing further emits a final exhaust. The final stage heater also includes a single spiral wound tube 62. The single spiral sound tube receives hot water from the three coils. The single spiral wound tube and the intermediate exhaust are in heat exchanging relationship within the final stage heater.

Provided last is a wand 66. The wand has a final line 68. The final line receives high pressure hot water from the final stage heater. The final line selectively delivers the received high pressure hot water to a carpet. In this manner cleaning is provided.

The steps of the sequence of operation are:

1. Cold water enters the mix tank front bottom panel of the system.
2. Water passes through a water solenoid activated by a float switch. Soap is mixed with the water by way of a low psi venturi valve and becomes a soapy mixture liquid. When the water fills the mix tank 24 at pre-determined level, the float switch shuts off water solenoid.
3. Engine 14 drives water pump 26 and blower 28 as mix tank water communicates with inlet of water pump 26.
4. Water exits out water pump 26 into pressure regulator 20 and becomes pressurized. As regulation occurs, water by-passes through the pressure regulator's by-pass port and liquid/water travels through a hose to the input port of the pre-heater.
5. Engine 14 is driving blower 28 and air enters blower 28 and exits out discharge port. This hot air enters pre-heater 22 heating liquid water by way of a by-pass hose from pressure regulator, step 4. Air then exists pre-heater 22 and through a muffler exiting in front of the system.
6. As the above steps 1 through 5 continue to occur, the mixture of soap and water gets warmer in the mix tank 24.
7. The pre-heated liquid/water enters the water pump 26 and is pressurized through the regulator, as mentioned in Step 4, and enters the coil heater 42 through the 3 coils. The exhaust gases are at this stage heating the tubing where the liquid/water is passing through.
8. The liquid/water exits out of the coil heater 42 and communicates with the final stage heater 58. The exhaust also exits the coil heater 42 and enters the rear input exhaust port of the final heater 58 heating the water as well as providing additional storage capacity. The heated water exits the front exit port of the final heater 58 in front of the machine where it is connected to a pressure hose and carpet wand. The exhaust exits the front exhaust port of the final heater 58 in the front of the carpet cleaning system.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A heat exchanger system comprising:

a coil heater assembly having a housing with a heated gas inlet and a heated gas outlet, the coil heater assembly having a plurality of coils formed of a single tube shaped into separate coils with a water inlet and a water outlet, each of the coils being spiraled around its own unique axis, the axes being parallel with respect to each other for maximizing the heat transfer between the gas and water within the coil heater assembly; and a water handling assembly including a pressure regulator and a pre-heater and a mix tank and a water pump to move pressurized water in a closed loop path between the pressure regulator and the pre-heater and the mix tank, the water handling assembly also including an air heating blower powered by the engine, the blower having an air inlet for generating a vacuum, the blower also having a heated air outlet coupled to the pre-heater for preheating water, the pre-heater including a water path with a single spiral wound tube through which water passes while moving from the pressure regulator to the mix tank, the pre-heater also having an air path with an input line from the blower and an output line, the water path and the air from the output of the blower being in heat exchanging relationship within the pre-heater, the mix tank including a water inlet line for supplying make-up water to the system, the mix tank adapted to store pre-heated water for circulation by the water pump.

2. A heat exchanger system for utilizing exhaust from an internal combustion engine to rapidly provide high pressure hot water for use in carpet cleaning in a safe, convenient and economical manner comprising, in combination:

an internal combustion engine with an engine output line, the engine creating gas as an initial exhaust dispensed through the engine output line, the engine adapted to provide motive power to other parts of the system;

a water handling assembly including a pressure regulator and a pre-heater and a mix tank and a water pump powered by the engine to move pressurized water in a closed loop path between the pressure regulator and the pre-heater and the mix tank, the water handling assembly also including an air heating blower powered by the engine, the blower having an air inlet for generating a vacuum, the blower also having a heated air outlet coupled to the pre-heater for preheating water in the water assembly, the pre-heater including a water path with a single spiral wound tube through which water passes while moving from the pressure regulator to the mix tank, the pre-heater also having an air path with an input line from the blower and an output line, the water path and the air from the output of the blower being in heat exchanging relationship within the pre-heater, the mix tank including a water inlet line for supplying make-up water to the system, the mix tank adapted to store pre-heated water for circulation by the water pump;

a three coil heater assembly having a cylindrical housing with an initial exhaust inlet from the engine and an intermediate exhaust outlet, the three coil heater assembly having a pre-heated pressurized water inlet from pressure regulator and a hot water outlet, the three coil heater assembly having three coils formed of a single tube formed into three separate coils coupled by fittings with a water inlet and a water outlet, each of the coils being of a common size and common shape, each of the coils being spiraled around its own unique axis, the axes being parallel with respect to each other and equally spaced from the housing for maximizing the heat transfer between the initial exhaust and water within the three coils;

a final stage heater including a housing for receiving intermediate exhaust from the three coil heater assembly and for emitting a final exhaust, the final stage heater also including a single spiral wound tube for receiving hot water from the three coils, the single spiral wound tube and the intermediate exhaust being in heat exchanging relationship within the final stage heater; and a wand with a final line for receiving high pressure hot water from the final stage heater and for selectively delivering the received high pressure hot water to a carpet for cleaning purposes.

* * * * *